US009596874B2

United States Patent
Haseleu et al.

(10) Patent No.: US 9,596,874 B2
(45) Date of Patent: Mar. 21, 2017

(54) BITTER TASTE MASKING COMPOSITIONS AND METHOD OF MASKING BITTER TASTE

(75) Inventors: Gesa Haseleu, Amsterdam (NL); Elisabetta Lubian, Zürich (CH); Harry Renes, Almere (NL); Cornelis Winkel, Bussum (NL)

(73) Assignee: Givaudan S.A., Vernier (CH)

( * ) Notice: Subject to any disclaimer, the term of this patent is extended or adjusted under 35 U.S.C. 154(b) by 153 days.

(21) Appl. No.: 13/989,107

(22) PCT Filed: Nov. 30, 2011

(86) PCT No.: PCT/EP2011/071428
§ 371 (c)(1),
(2), (4) Date: Aug. 12, 2013

(87) PCT Pub. No.: WO2012/072701
PCT Pub. Date: Jun. 7, 2012

(65) Prior Publication Data
US 2013/0309381 A1     Nov. 21, 2013

(30) Foreign Application Priority Data
Nov. 30, 2010 (GB) .................................. 1020255.4

(51) Int. Cl.
*A23L 1/22* (2006.01)

(52) U.S. Cl.
CPC .......... *A23L 1/22091* (2013.01); *A23L 27/202* (2016.08); *A23L 27/2026* (2016.08); *A23L 27/40* (2016.08); *A23L 27/86* (2016.08); *A23L 27/88* (2016.08)

(58) Field of Classification Search
CPC ...... A23L 1/22091; A23L 27/86; A23L 27/40; A23L 27/202; A23L 27/2026; A23L 27/88
USPC .......................... 426/534, 535, 536, 537, 538
See application file for complete search history.

(56) References Cited

U.S. PATENT DOCUMENTS

| | | | |
|---|---|---|---|
| 4,243,691 A | 1/1981 | Mohlenkamp et al. |
| 6,783,788 B2 | 8/2004 | Kuroda et al. |
| 7,981,457 B2 | 7/2011 | Visser et al. |
| 2002/0187243 A1 | 12/2002 | Kuroda et al. |
| 2008/0038428 A1 | 2/2008 | Visser et al. |
| 2008/0038429 A1 | 2/2008 | Visser et al. |
| 2008/0038430 A1 | 2/2008 | Visser et al. |
| 2008/0199595 A1 | 8/2008 | Zasypkin et al. |
| 2009/0104330 A1 | 4/2009 | Zasypkin |

FOREIGN PATENT DOCUMENTS

| | | |
|---|---|---|
| EP | 1230862 A2 | 8/2002 |
| FR | 2276057 A1 | 1/1976 |
| JP | 62032855 A | 2/1987 |
| WO | WO 2005/096843 A1 | 10/2005 |
| WO | WO 2005/096844 A1 | 10/2005 |
| WO | WO 2006/009425 A1 | 1/2006 |
| WO | WO 2006/046853 A1 | 5/2006 |

OTHER PUBLICATIONS

PCT/EP2011/071428—International Search Report, Mar. 22, 2012.
PCT/EP2011/071428—International Written Opinion, Mar. 22, 2012.
PCT/EP2011/071428—International Preliminary Report on Patentability, Jun. 4, 2013.
GB 1020255.4—Search Report, Mar. 28, 2011.

*Primary Examiner* — Leslie Wong
(74) *Attorney, Agent, or Firm* — Curatolo Sidoti Co., LPA; Joseph G. Curatolo; Salvatore A. Sidoti

(57) ABSTRACT

A composition for masking the bitter taste of potassium chloride or other potassium salt used in a consumable product as a substitute, in whole or in part, for common table salt, said composition comprising a sugar alcohol and a compound of formula (I)

$$CH_2OH-(CHOH)_4-CO-NH-CH_2-CH_2-X;$$

a compound of the formula (II):

$$R^1-CR^2(OR^3)-CO-Y;$$

or a mixture thereof.

20 Claims, No Drawings

BITTER TASTE MASKING COMPOSITIONS AND METHOD OF MASKING BITTER TASTE

CROSS REFERENCE TO RELATED APPLICATIONS

This application is a national stage application of International Application No. PCT/EP2011/071428, filed 30 Nov. 2011, which claims priority from Great Britain Patent Application No. 1020255.4, filed 30 Nov. 2010, from which applications priority is claimed, and which are incorporated herein by reference.

The present invention is concerned with preparations for masking the bitter taste of potassium salts, in particular potassium chloride, as such or used in consumable products as a replacement, wholly or partially, for common table salt. Potassium salts are not only useful to reduce sodium consumption, the amount of potassium currently consumed by the average consumer is lower than recommended by health-promoting institutions. In addition this invention is concerned with the masking of off-notes of other salts like calcium, magnesium and ammonium salts.

Common table salt (sodium chloride) consumption is well known to have deleterious effects on health. It is implicated as a causative agent in cases of high blood pressure, heart disease and all manner of other deleterious conditions.

There has been a strong tendency in recent years to reduce or eliminate sodium chloride from foodstuffs.

Potassium chloride is an example of what is commonly referred to as a substitute for common table salt in order to compensate for a perceived lack of saltiness in products that contain low or no added table salt. One drawback to the use of potassium chloride in foodstuffs is a bitter aftertaste associated with its use.

It has been proposed to use sugar alcohols in combination with potassium chloride to lessen this bitter after taste. The use of sugar alcohols such as mannitol or sorbitol has been proposed to reduce the bitter after taste associated with the use of potassium chloride in JP laid open application S62-32855.

However, relatively large amounts of sugar alcohol are proposed, in particular a 3 to 50-fold excess compared with the amount of potassium chloride employed. As these sugar alcohols also may exert an organoleptic effect in their own right, it is desirable to reduce the levels of these materials as low as possible whilst still exerting the desired bitter-masking effect. At the same time, the applicants have observed that the use of sugar alcohols can also slightly lessen the salty perception of potassium chloride.

There remains a need to provide improved bitter-masking compositions that mask the bitter after taste associated with the use in consumable products of potassium chloride or another potassium salt as such or as a substitute, in whole or in part, for common table salt, which bitter masking compositions may employ very low levels of sugar alcohols.

The applicant has now found that it is possible to reduce or eliminate the bitter tastes associated with the use of potassium chloride or another potassium salt as such or as a substitute, in whole or in part, for common table salt, whilst retaining, or substantially retaining, its salty taste employing a composition having a low concentration of a sugar alcohol.

The invention provides in a first aspect a method of masking the bitter taste associated with the use in a consumable product of potassium chloride or other another potassium salt as such or that is used as a substitute, in whole or in part, for common table salt, said method comprising the step of adding to said product a bitter masking composition comprising a sugar alcohol; together with a compound of formula (I):

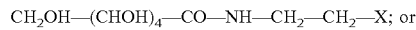

$CH_2OH—(CHOH)_4—CO—NH—CH_2—CH_2—X$; or a compound of the formula (II):

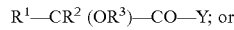

$R^1—CR^2(OR^3)—CO—Y$; or a flavour modulating substance of the formula (III)

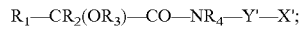

$R_1—CR_2(OR_3)—CO—NR_4—Y'—X'$;

or mixtures thereof, wherein the significance of the substituents X, Y, $R^1$, $R^2$, and $R^3$, and $R_1$, $R_2$, $R_3$, $R_4$, X' and Y' are set out herein below.

In a particular embodiment of the present invention the bitter masking composition comprises a sugar alcohol and a compound of formula (I); a compound of formula (II) or mixtures thereof. However, it will be appreciated that the present invention contemplates combining the compounds (I), (II) and the flavour modulating substances (III) in any manner and in any amount, together with the sugar alcohol in order to provide the desired bitter masking effect.

The sugar alcohol may be employed in said bitter masking composition in amounts of 55% by weight or more; more particularly 80% or more; still more particularly 55% to 99.8%; still more particularly 80% to 99.8% by weight based on the total weight of said bitter masking composition.

The amount of bitter masking composition that may be added to a consumable product should be in an amount relative to potassium salt sufficient to ensure effective masking of the bitter taste associated with the use of said potassium salt. The amount of bitter masking composition employed may be such that the weight ratio of sugar alcohol to potassium salt is 1:20 to 2:1, more particularly 1:5 to 1:1.

A compound of formula (I) may be employed in said bitter masking composition in amounts of 0.2 to 5% by weight based on the total weight of said bitter masking composition.

The compound of formula (I) may be employed in said bitter masking composition in amounts to ensure that it is present in a consumer product in amounts of 5 to 250 ppm A compound of the formula (II) may be employed in said bitter masking composition in amounts of 5 to 25% by weight based on the total weight of said bitter masking composition.

The compound of formula (II) may be employed in said bitter masking composition in amounts to ensure that it is present in a consumer product in amounts of 10 to 2500 ppm, more particularly 100 to 2500 ppm, still more particularly 10 to 1000 ppm.

The flavour modulating substance (III), and in particular N-lactoyl tyramine, may be employed in said bitter masking composition in an amount of 1 to 15% by weight based on the total weight of said bitter masking composition.

The flavour modulating substance, in particular N-lactoyl tyramine, may be employed in said bitter masking composition in amounts to ensure that it is present in a consumer product in amounts of 10 to 100 ppm.

The amount of potassium chloride or other suitable potassium salt that is typically employed in consumable products as such or as a substitute in whole of in part for common table salt will depend to some extent on the nature of the consumable product. However, the amount of potassium ion may vary within wide limits such as 100 to 30,000 ppm. Potassium salts may be used to replace totally common table salt, or they may be used to replace 1 to 60% of table salt used in consumable products.

The applicant surprisingly found that using a compound of formula (I) and/or a compound of formula (II), and or a flavour modulating substance (III) in a bitter masking composition, it was possible to potentiate the effect of the sugar alcohol, making it possible to substantially reduce the amount of sugar alcohol used in consumable compositions.

Accordingly, the invention provides in yet another of its aspects the use of a compound of formula (I) and/or compound of formula (II) and/or a flavour modulating substance (III), more particularly N-lactoyl tyramine, in conjunction with a sugar alcohol to mask the bitter taste of potassium chloride or other potassium salt used in a consumable product as such or as a substitute, in whole or in part, for common table salt.

In yet another aspect of the invention there is provided a method of potentiating the bitter masking effect of sugar alcohols in consumable products containing potassium chloride or other potassium salt as such or as a substitute, in whole or in part, for common table salt, said method comprising the step of adding to said consumable product a compound of formula (I) and/or compound of formula (II) and/or a flavour modulating substance (III), more particularly N-lactoyl tyramine.

In addition to this potentiating effect, the applicant also surprisingly discovered that whereas sugar alcohols can slightly reduce the salty perception of potassium salts, when a compound of formula (I) and/or formula (II) and/or a flavour modulating substance (III), more particularly N-lactoyl tyramine were employed with the sugar alcohol, the salty perception was not reduced or not substantially so.

Moreover, when using sugar alcohols as bitter masking agents for potassium salts, there can be an initial time lag when it is possible to perceive bitterness, before the masking effect is realised. Similarly, at the end of tasting, it is possible to perceive breakthrough bitterness as the effect of the sugar alcohol weakens. It was found that the addition of a compound of formula (I) and/or formula (II) and/or a flavour modulating substance (III), more particularly N-lactoyl tyramine helped to make the bitterness masking more complete, from initial tasting until the end of tasting.

Accordingly, the invention provides in yet another aspect of the invention the use of a compound of formula (I) and/or compound of formula (II) and/or a flavour modulating substance (III), more particularly N-lactoyl tyramine in conjunction with a sugar alcohol to mask the bitter taste of potassium chloride or other another potassium salt used in a consumable product as such or as a substitute, in whole or in part, for common table salt, whilst retaining or substantially retaining the salty perception of the potassium salt.

The sugar alcohols useful in the present invention may be selected from the group consisting of Ethylene glycol, Glycerol, Erythritol, Threitol, Ribitol, Arabitol, Xylitol, Lyxitol, Allitol, Altritol, Glucitol (=sorbitol), Mannitol, Gulitol, Iditol, Galactitol (=dulcitol), Talitol, Lactitol, Maltitol, Cellobiitol, Raffinitol, or compounds structurally related to sugar alcohols such as such as Inositol, Tetrahydroxycyclobutane, Pentahydroxycyclopentane, Heptahydroxycycloheptane, or partially hydrolyzed polysaccharides that have undergone a NaBH4 reduction step, and derivatives thereof.

In a particularly preferred embodiment of the present invention, the sugar alcohol is dulcitol.

Although by virtue of the present invention it is possible to substantially reduce the amount of sugar alcohol required to achieve a bitter masking effect, and this represents a considerable advantage of the present invention, nevertheless for some applications, such as in highly flavoured consumable products or in the case of consumable wherein the hedonic effect of the sugar alcohols is tolerable or even acceptable it is possible to use them in higher amounts than the amounts specifically referred to above, for example 10%

Having regard to the compounds of formula (I) referred to hereinabove, X represents —OH, —O(CO)R, —OPO$_3$H$_2$, —PO$_3$H$_2$, —OSO$_3$H or —SO$_3$H, and R represents a C$_2$-C$_{10}$ group comprising at least one carboxylic acid group, and edible salts thereof.

Preferably X represents a hydroxyl group, a phosphate group, a phosphonate group, a sulfate group or a sulfonate group. Even more preferably, X represents a hydroxyl group, a phosphate group or a phosphonate group. Most preferably, X represents a hydroxyl or a phosphate group.

In the formula (I) the CH$_2$OH—(CHOH)$_4$—CO— moiety preferably represents an aldonic acid residue selected from the group of allonic acid, altronic acid, gluconic acid, mannonic acid, gulonic acid, idonic acid, galactonic acid and talonic acid. Even more preferably said moiety represents the residue of gluconic acid or mannonic acid.

Compounds of formula (I) of particular interest are those wherein X represents —O(CO)R, —OPO$_3$H$_2$, —PO$_3$H$_2$, —OSO$_3$H or —SO$_3$H, and R represents a C$_2$-C$_{10}$ group comprising at least one carboxylic acid group, more preferably a C$_2$-C$_7$ group comprising one carboxylic acid group; and edible salts thereof.

Other compounds of formula (I) of interest are those wherein X represents a hydroxyl group and the CH$_2$OH—(CHOH)$_4$—CO— moiety represents a residue of an aldonic acid selected from allonic acid, altronic acid, mannonic acid, gulonic acid, idonic acid, galactonic acid and talonic acid.

Yet further interesting compounds of formula (I) are those wherein X represents a phosphate group, a phosphonate group, a sulfate group or a sulfonate group, the CH$_2$OH—(CHOH)$_4$—CO—moiety preferably representing a residue of an aldonic acid selected from gluconic acid and mannonic acid.

In a particularly preferred embodiment the substance according to formula (I) is a gluconic acid derivative of ethanolamine, commonly referred to as N-gluconyl ethanolamine, or an edible salt thereof.

Compounds of formula (I) are known in the art and can be produced by known syntheses, see for example WO2006009425, which is hereby incorporated by reference.

Having regard to the compounds of formula (II) referred to hereinabove R$^1$ represents hydrogen; C$_1$-C$_8$ alkyl, C$_2$-C$_8$ alkenyl, C$_3$-C$_8$ cycloalkyl or C$_3$-C$_8$ cycloalkenyl, each optionally substituted with 1-8 substituents selected from hydroxyl, C$_1$-C$_3$ alkyl; C$_2$-C$_3$ alkenyl and C$_1$-C$_3$ carboxyl;

R$^2$ represents hydrogen; C$_1$-C$_8$ alkyl, C$_2$-C$_8$ alkenyl, C$_3$-C$_8$ cycloalkyl or C$_3$-C$_8$ cycloalkenyl, each optionally substituted with 1-8 substituents selected from hydroxyl, C$_1$-C$_3$ alkyl, C$_2$-C$_3$ alkenyl and C$_1$-C$_3$ carboxyl;

R$^3$ represents hydrogen; C$_1$-C$_3$ acyl or C$_1$-C$_3$ alkyl, each optionally substituted with 1-3 hydroxyl groups; and wherein Y represents either (i) a six membered heterocyclic ring, comprising at least two nitrogen atoms, which heterocyclic ring is optionally further substituted with one or more substituents selected from the group of amino; hydroxyl; oxo; alkyl; and monosaccharide unit, said monosaccharide unit optionally being esterified with one or more mono-, di- and/or triphosphate groups; or (ii) a bicyclic system comprising a five membered heterocyclic ring and a six membered heterocyclic ring, each ring comprising at least two nitrogen atoms, and each ring being optionally further substituted with one or more substituents selected from the group of amino; hydroxyl; oxo; alkyl; and monosaccharide unit, said monosaccharide unit optionally being esterified with one or more mono-, di- and/or triphosphate groups Preferred compounds of formula (II) are those compounds wherein Y represents an optionally substituted purine or pyrimidine radical, optionally substituted with at least one amino and/or at least one oxo group. The purine or pyrimidine radicals preferably comprise at least one, more preferably at least two sites of unsaturation in the heterocyclic ring or ring system.

The purine and pyrimidine radicals are preferably substituted with a monosaccharide unit, especially a pentose of hexose monosaccharide unit, and most preferably a pentose monosaccharide unit. Ribose and deoxyribose are examples of pentose units which can be incorporated in the present compounds.

The aforementioned monosaccharide unit preferably is esterified with one or more phosphate groups selected from monophosphate, diphosphate and triphosphate. Even more preferably the monosaccharide unit is esterified with one such phosphate group, monophosphate being most preferred.

According to another preferred embodiment, Y represents an optionally substituted purine or a pyrimidine radical selected from the group of uracil, thymine, cytosine, guanine, adenine, hypoxanthine, xanthine, theophylline and theobromine, even more preferably, from the group of guanine, cytosine and adenine. In a most preferred embodiment Y represents guanosine monophosphate (GMP), adenosine monophosphate (AMP), cytidine monophosphate (CMP) or inosine monophosphate (IMP), more preferably Y represents GMP, IMP or CMP, GMP and IMP being even more particularly preferred. Most preferably, Y represents GMP. Here the term "monophosphate" also encompasses cyclic monophosphate.

According to another preferred embodiment in compounds of formula (II) $R^1$ represents $C_2$-$C_8$ alkyl or $C_4$-$C_6$ cycloalkyl, said alkyl or cycloalkyl being substituted with 1-6 hydroxyl groups and/or 1-3 carboxyl groups. Even more preferably, $R^1$ represents $C_2$-$C_6$ alkyl, substituted with 2-6 hydroxyl groups. Most preferably, $R^1$ represents $C_3$-$C_5$ alkyl, substituted with 3-5 hydroxyl groups.

Alternatively, in another preferred embodiment $R^1$ represents hydrogen or $C_1$-$C_4$ alkyl, more preferably it represents $C_1$-$C_2$ alkyl, most preferably methyl.

In the aforementioned formula (II) $R^2$ preferably represents hydrogen or $C_1$-$C_4$ alkyl, most preferably hydrogen. Likewise, $R^3$ preferably represents hydrogen; or $C_1$-$C_3$ acyl, optionally substituted with 1-3 hydroxyl groups, more preferably it represents hydrogen or $C_1$-$C_3$ acyl or $C_2$-$C_3$ acyl substituted with 2-3 hydroxyl groups, most preferably $R^3$ represents hydrogen.

According to a preferred embodiment Y represents a heterocyclic ring or ring system which is substituted with at least a pentose monosaccharide unit and the CO—Y bond in formula (I) represents an ester bond. More particularly, it represents an ester bond connecting the $R^1$—$CR^2$ ($OR^3$)—CO— to an oxygen atom of a pentose monosaccharide unit substituted on the heterocyclic ring or ring system.

In another preferred embodiment of the invention the CO—Y bond represents an amide bond, particularly an amide bond connecting the acyl group with an amino group substituted on the heterocyclic ring or ring system or with a nitrogen atom in the heterocyclic ring or ring system as described above. Most preferably, the amide bond connects the acyl group with a nitrogen atom substituted on the heterocyclic ring or ring system.

Compounds of formula (II) that are particularly preferred include N-lactoyl GMP, N-lactoyl AMP, N-lactoyl CMP, N-lactoyl IMP, N-gluconyl GMP, N-gluconyl AMP, N-gluconyl CMP and N-gluconyl IMP; N-lactoyl GMP and N-gluconyl GMP being particularly preferred.

Compounds of formula (II) are known in the art and can be made by reacting a compound YH with an alpha-hydroxylcarboxylic acid or its carboxylate according to known syntheses as more fully described in WO2005096843, which is hereby incorporated by reference.

The compounds of formula (II) may be used in pure form, or they may be used as part of a flavour preparation as set out in WO2005096844, which is hereby incorporated by reference. When used as part of such a flavour preparation, the compound of formula (II) may be formed in-situ as the flavour preparation is created, as is more fully described in WO2005096844.

Flavour modulating substances (III) useful in the present invention are set forth in WO2006/046853 as stated hereinabove. This citation is incorporated herein by reference.

The flavour modulating substances set forth in WO2006/046853 are represented by the formula

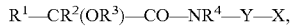

whereas in the present document, for clarity we refer to the same substances using the formula

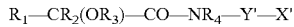

The symbols $R_1$, $R_2$, $R_3$, $R_4$, Y' and X' are intended to represent the symbols $R^1$, $R^2$, $R^3$, $R^4$, Y and X respectively as used in WO 2006/046853.

A preferred flavour modulating substance is N-lactoyl tyramine.

In a preferred embodiment of the present invention, the bitter masking composition contains, in addition to the sugar alcohol, a compound of formula (I), and compound of formula (II) and a flavour modulating substance (III). Particularly preferred a bitter masking compositions containing sugar alcohol, most preferably mannitol, N-2-hydroxyethyl gluconamide, N-lactoyl GMP and N-lactoyl tyramine.

Without prejudice to the general applicability of the bitter masking composition described herein, which will be more fully discussed below, it is particularly useful in applications wherein the consumable product contains relatively high levels of salt, such as meat-products, cheeses, margarines, mayonnaises, dressings and bread. As stated above, sugar alcohols are very effective at reducing bitterness in compositions containing potassium ions, but at the same time as they reduce bitterness, they also do tend to slightly reduce the perceived saltiness of potassium salts, and in particular potassium chloride.

Nevertheless, the bitter masking composition according to the invention may be employed in all manner of consumable compositions, which contain potassium chloride or another potassium salt that is used as a replacement for common table salt. By "consumable compositions" is meant any solid or liquid composition that is consumed for at least one of nourishment and pleasure. A broad general list includes, but is not limited to, foodstuffs of all kinds, confectionery, baked goods, sweet goods, dairy products and beverages. More specific examples follow:

The term "confectionery" includes, but is not limited to: chewing gum (which includes sugarized gum, sugar-free gum, functional gum and bubble gum), centerfill confections, chocolate and other chocolate confectionery, medicated confectionery, lozenges, tablets, pastilles, mints, standard mints, power mints, chewy candies, hard candies, boiled candies, breath and other oral care films or strips, candy canes, lollipops, gummies, jellies, fudge, caramel, hard and soft panned goods, toffee, taffy, liquorice, gelatin candies, gum drops, jelly beans, nougats, fondants, or combinations of one or more of these, or edible compositions incorporating one or more of these.

The confectionery compositions can be incorporated into an otherwise conventional hard or soft confectionery format using standard techniques and equipment known to those of ordinary skill in the art. The confectionery compositions can also be center filled and/or coated with hard, soft, or particulate coatings.

The term "baked goods" includes, but is not limited to: alfajores, bread, packaged/industrial bread, unpackaged/artisanal bread, pastries, cakes, packaged/industrial cakes, unpackaged/artisanal cakes, cookies, chocolate coated biscuits, sandwich biscuits, filled biscuits, savory biscuits and crackers, bread substitutes.

The term "sweet goods" includes, but is not limited to: breakfast cereals, ready-to-eat ("rte") cereals, family breakfast cereals, flakes, muesli, other rte cereals, children's breakfast cereals, hot cereals,.

The term "dairy products" includes, but is not limited to: ice cream, impulse ice cream, single portion dairy ice cream, single portion water ice cream, multi-pack dairy ice cream, multi-pack water ice cream, take-home ice cream, take-home dairy ice cream, ice cream desserts, bulk ice cream, take-home water ice cream, frozen yoghurt, artisanal ice cream, dairy products, milk, fresh/pasteurized milk, full fat fresh/pasteurized milk, semi skimmed fresh/pasteurized milk, long-life/uht milk, full fat long life/uht milk, semi skimmed long life/uht milk, fat-free long life/uht milk, goat milk, condensed/evaporated milk, plain condensed/evaporated milk, flavoured, functional and other condensed milk, flavoured milk drinks, dairy only flavoured milk drinks, flavoured milk drinks with fruit juice, soy milk, sour milk drinks, fermented dairy drinks, coffee whiteners, powder milk, flavoured powder milk drinks, cream, yoghurt, plain/natural yoghurt, flavoured yoghurt, fruited yoghurt, probiotic yoghurt, drinking yoghurt, regular drinking yoghurt, probiotic drinking yoghurt, chilled and shelf-stable desserts, dairy-based desserts, soy-based desserts.

Other foodstuff includes, but is not limited to: chilled snacks, sweet and savory snacks, fruit snacks, chips/crisps, extruded snacks, tortilla/corn chips, popcorn, pretzels, nuts, other sweet and savory snacks, snack bars, granola bars, breakfast bars, energy bars, fruit bars, other snack bars, meal replacement products, slimming products, convalescence drinks, ready meals, canned ready meals, frozen ready meals, dried ready meals, chilled ready meals, dinner mixes, frozen pizza, chilled pizza, soup, canned soup, dehydrated soup, instant soup, chilled soup, uht soup, frozen soup, pasta, canned pasta, dried pasta, chilled/fresh pasta, noodles, plain noodles, instant noodles, cups/bowl instant noodles, pouch instant noodles, chilled noodles, snack noodles, dried food, dessert mixes, sauces, dressings and condiments, herbs and spices, spreads, jams and preserves, honey, chocolate spreads, nut-based spreads, and yeast-based spreads.

The term "beverage" as used herein means any drinkable liquid or semi-liquid, including for example:
flavoured water, soft drinks, fruit drinks, coffee-based drinks, tea-based drinks, juice-based drinks (includes fruit and vegetable), milk-based drinks, gel drinks, carbonated or non-carbonated drinks, powdered drinks, alcoholic or non-alcoholic drinks.

In the preparation of the abovementioned products, there may be used all or any of the standard ingredients found in such products, used in art-recognised quantities. Examples of such ingredients include (but are by no means limited to) solvents and co-solvents; surfactants and emulsifiers; viscosity and rheology modifiers; thickening and gelling agents; preservative materials; pigments, dyestuffs and colouring matters; extenders, fillers and reinforcing agents; stabilisers against the detrimental effects of heat and light, bulking agents, flavouring and flavour-enhancing agents, warming agents, breath fresheners, mouth moisteners, coloring agents, acidulants, buffering agents, antioxidants and sweetening agents.

Suitable bulking agents may include mineral adjuvants, which may serve as fillers and textural agents. Suitable mineral adjuvants include calcium carbonate, magnesium carbonate, alumina, aluminum hydroxide, aluminum silicate, talc, tricalcium phosphate, tricalcium phosphate and the like, which can serve as fillers and textural agents.

Additional bulking agents (e.g. carriers, extenders) suitable for use include sweetening agents such as monosaccharides, disaccharides, polysaccharides, polydextrose, and maltodextrins; minerals, such as calcium carbonate, talc, titanium dioxide, dicalcium phosphate; and combinations thereof.

Fillers modify the texture and aid processing. Examples of such fillers include magnesium and aluminum silicates, clay, alumina, talc, titanium oxide, cellulose polymers, and the like.

Specific examples of flavouring agents include, but are not limited to:
natural flavours, artificial flavours, spices, seasonings, and the like. Exemplary flavouring agents include synthetic flavour oils and flavouring aromatics and/or oils, oleoresins, essences, distillates, and extracts derived from plants, leaves, flowers, fruits, and so forth, and a combination comprising at least one of the foregoing.

Exemplary flavour oils include spearmint oil, cinnamon oil, oil of wintergreen (methyl salicylate), peppermint oil, Japanese mint oil, clove oil, bay oil, anise oil, eucalyptus oil, thyme oil, cedar leaf oil, oil of nutmeg, allspice, oil of sage, mace, oil of bitter almonds, and cassia oil; useful flavouring agents include artificial, natural and synthetic fruit flavours such as vanilla, and citrus oils including lemon, orange, lime, grapefruit, yazu, sudachi, and fruit essences including apple, pear, peach, grape, blueberry, strawberry, raspberry, cherry, plum, prune, raisin, cola, guarana, neroli, pineapple, apricot, banana, melon, apricot, ume, cherry, raspberry, blackberry, tropical fruit, mango, mangosteen, pomegranate, papaya and so forth. Additional exemplary flavours imparted by a flavouring agent include a milk flavour, a butter flavour, a cheese flavour, a cream flavour, and a yogurt flavour; a vanilla flavour; tea or coffee flavours, such as a green tea flavour, an oolong tea flavour, a tea flavour, a cocoa flavour, a chocolate flavour, and a coffee flavour; mint flavours, such as a peppermint flavour, a spearmint flavour, and a Japanese mint flavour; spicy flavours, such as an asafetida flavour, an ajowan flavour, an anise flavour, an angelica flavour, a fennel flavour, an allspice flavour, a cinnamon flavour, a chamomile flavour, a mustard flavour, a cardamom flavour, a caraway flavour, a cumin flavour, a clove flavour, a pepper flavour, a coriander flavour, a sassafras flavour, a savory flavour, a Zanthoxyli Fructus flavour, a perilla flavour, a juniper berry flavour, a ginger flavour, a star anise flavour, a horseradish flavour, a thyme flavour, a tarragon flavour, a dill flavour, a capsicum flavour, a nutmeg flavour, a basil flavour, a marjoram flavour, a rosemary flavour, a bayleaf flavour, and a wasabi (Japanese horseradish) flavour; a nut flavour such as an almond flavour, a hazelnut flavour, a macadamia nut flavour, a peanut flavour, a pecan flavour, a pistachio flavour, and a walnut flavour; alcoholic flavours, such as a wine flavour, a whisky flavour, a brandy flavour, a rum flavour, a gin flavour, and a liqueur flavour; floral flavours; and vegetable flavours, such as an onion flavour, a garlic flavour, a cabbage flavour, a carrot flavour, a celery flavour, mushroom flavour, and a tomato flavour. Generally any flavouring or food additive such as those described in Chemicals Used in Food Processing, publication 1274, pages 63-258, by the National Academy of Sciences, can be used. This publication is incorporated herein by reference. There may additionally be present nutraceuticals and medicaments.

Suitable nutraceuticals may include herbs and botanicals such as aloe, bilberry, bloodroot, calendula, capsicum, chamomile, cat's claw, echinacea, garlic, ginger, ginkgo, goldenseal, various ginseng, green tea, guarana, kava kava, lutein, nettle, passionflower, rosemary, saw palmetto, St. John's wort, thyme, and valerian. Also included are mineral supplements such as calcium, copper, iodine, iron, magnesium, manganese, molybdenum, phosphorous, zinc, and selenium. Other nutraceuticals may include fructooligosaccharides, glucosamine, grapeseed extract, cola extract, guarana, ephedra, inulin, phytosterols, phytochemicals, catechins, epicatechin, epicatechin gallate, epigallocatechin, epigallocatechin gallate, isoflavones, lecithin, lycopene, oligofructose, polyphenols, flavanoids, flavanols, flavonols, and psyllium as well as weight loss agents such as chromium picolinate and phenylpropanolamine. Exemplary vitamins and co-enzymes include water or fat soluble vitamins such as thiamin, riboflavin, nicotinic acid, pyridoxine, pantothenic acid, biotin, folic acid, flavin, choline, inositol and para-aminobenzoic acid, carnitine, vitamin C, vitamin D and its analogs, vitamin A and the carotenoids, retinoic acid, vitamin E, vitamin K, vitamin B6, and vitamin B12. Combinations comprising at least one of the foregoing nutraceuticals may be used. Suitable medicaments may include oral care agents, throat care agents, allergy relief agents, and general medical care agents. General medical care agents may include antihistamines, decongestants (sympathomimetics), antitussives (cough suppressants), antiinflammatories, homeopathic agents, expectorants, anesthetics, demulcents, analgesics, anticholinergics, throat- soothing agents, antibacterial agents, antiviral agents, antifungal agents, antacids, antinauseants, chemotherapeutics, diuretics, psychotherapeutic agents, cardiovascular agents, various alkaloids, laxatives, appetite suppressants, ACE-inhibitors, anti-asthmatics, anti-cholesterolemics, antidepressants, anti-diarrhea preparations, anti-hypertensives, anti-lipid agents, acne drugs, amino acid preparations, anti-uricemic drugs, anabolic preparations, appetite stimulants, bone metabolism regulators, contraceptives, endometriosis management agents, enzymes, erectile dysfunction therapies such as sildenafil citrate, fertility agents, gastrointestinal agents, homeopathic remedies, hormones, motion sickness treatments, muscle relaxants, osteoporosis preparations, oxytocics, parasympatholytics, parasympathomimetics, prostaglandins, respiratory agents, sedatives, smoking cessation aids such as bromocriptine or nicotine, tremor preparations, urinary tract agents, anti-ulcer agents, anti-emetics, hyper- and hypoglycemic agents, thyroid and anti-thyroid preparations, terine relaxants, erythropoietic drugs, mucolytics, DNA and genetic modifying drugs, and nutritional supplements, including nutraceuticals, micronutrients, vitamins and co-enzymes. The pharmaceutically acceptable salts and prodrugs of the medicaments are also included unless specified otherwise. Some of these medicaments may serve more than one purpose. Combinations of the foregoing types of optional medicaments can be used. Two or more medicaments that have activity against the same or different symptoms can be used together in a combination. Other suitable and desirable additives are described in standard texts, such as "Handbook of Industrial Chemical Additives", ed. M. and I. Ash, $2^{nd}$ Ed., (Synapse 2000).

Some of these materials may be present in encapsulated form. By "encapsulated form" is meant that the material is contained within an encapsulating material, which protects and/or retains it and permits its release either gradually or completely. All known methods of encapsulation, may be used, for example, coacervation, spray drying, and absorption into a porous substrate. All possible encapsulation materials may also be used, for example, natural fibres, minerals of large surface area and polymeric materials.

There now follow a series of examples that serves to illustrate the invention.

EXAMPLE 1

Three solutions were prepared:
A 1600 ppm of KCl and 800 ppm of NaCl in water
B 1600 ppm of KCl and 800 ppm of NaCl in water containing 5000 ppm of mannitol
C 1600 ppm of KCl and 800 ppm of NaCl in water containing 5000 ppm of dulcitol The solutions were compared by a panel of professional tasters. They agreed that both mannitol and dulcitol mask the off-notes KCl well. However the dulcitol was noticeably better in masking and gave a more positive, described as 'rounded-off', perception.

EXAMPLE 2

Light Margarine was obtained from a local supermarket. In one box 0.4% KCl was thoroughly mixed in (sample A) and in another box 0.4% KCl together with 0.5% mannitol, 30 ppm N-2-hydroxyethyl gluconamide and 500 ppm of a flavour containing a compound of formula (II), i.e. Lac GMP as part of a flavour preparation as prepared in WO2005/096844, was thoroughly mixed (Sample B). A panel of professional tasters compared the two samples and all agreed the sample B was significantly less bitter than sample A

EXAMPLE 3

Light Margarine was obtained from a local supermarket. Three samples were prepared:
A Margarine containing 0.4% KCl
B Margarine containing 0.4% KCl and 0.5% mannitol
C Margarine containing 0.4% KCl, 0.5% mannitol and 30 ppm N-2-hydroxyethyl gluconamide and 500 ppm of a flavour containing a compound of formula (II), i.e. Lac GMP as part of a flavour preparation as prepared in WO2005/096844.

A panel of professional tasters compared the three samples and there was consensus that in sample C the KCl off-taste was better reduced than in sample B.

EXAMPLE 4

A salad dressing with low salt level was prepared as follows:
Water (28.92), Sugar (20.25), Colemans Mustard Powder (1.16), Salt (2.00), Egg Yolk Powder (0.58), Col Flo 67 (0.31), Guar (0.23), Xanthan (0.04), Riboflavin (0.002) and Maltodextrin (0.22) were mixed in a Termomix at high mixing speed for 3 minutes at 60 C and 1 minute at 90 C. Subsequently the Vegetable oil (32.40), was added in slowly at maximum mixing speed. At last the Vinegar 8% (13.88) is mixed in slowly.

Two samples were prepared for tasting:
A Salad dressing with 2% KCl
B Salad dressing with 2% KCl and 0.5% dulcitol, 30 ppm N-2-hydroxyethyl gluconamide and 500 ppm of a flavour containing a compound of formula (II), i.e. Lac GMP as part of a flavour preparation as prepared in WO2005/096844

The two samples were compared by a professional panel. The panel agreed that the Typical KCl bitterness tasted in sample A was almost completely masked in sample B.

EXAMPLE 5

A vegetarian bouillon (5% salt) was prepared as follows:
Salt (15.5), Dextrose Monohydrate (Tapioca) (15.7), Celery Oleoresin (0.02), Oleoresin Turmeric Vegex (0.03), Oleoresin Coriander Seed (0.02), Maltodextrin 5-8 DE (44.48), Vegetable Oil Soybean Refined (4), Yeast Standard Light (3), Onion Powder (0.4), Garlic Powder (0.4), White Pepper (0.05) and Potato Starch (16.4) were mixed in a dry blender. 32G of bouillon powder was dosed per liter of water.

Two samples were prepared for tasting:
A Bouillon with 0.4% KCl
B Bouillon with 0.4% KCl and 0.5% dulcitol, 30 ppm N-2-hydroxyethyl gluconamide and 500 ppm of a flavour containing a compound of formula (II), i.e. Lac GMP as part of a flavour preparation as prepared in WO2005/096844.

The two samples were compared by a professional panel. The panel agreed that sample B lacked the offnotes that were present in sample A.

EXAMPLE 6

Bread was prepared by mixing 1250 g of wheat flour, 250 g of white wheat flour, 60 g of yeast. Three salt mixtures were added to separate flour blends:
A 30 g NaCl
B 18 g NaCl and 15 g KCl
C 18 g NaCl, 15g KCl and 12 g dulcitol Doughs were prepared by mixing the ingredients and adding 900 g of water. The doughs were allowed to rise at room temperature for 2 hours and baked at 220 C for 45 minutes.

A panel of professional tasters compared the breads. The reference sample A was 10 preferred. Sample B was disliked. Sample C came close to the reference bread but some off-notes were noticeable.

EXAMPLE 7

Light margarine was obtained from a supermarket. KCl at 0.4% was thoroughly mixed into one box containing the margarine to give a sample A. In another box, 0.4% KCl, together with dulcitol (0.5%); N-2-hydroxy gluconamide (30 ppm), N-lactoyl tyramine (90 ppm) and 500 ppm of a flavour preparation containing Lactoyl GMP and prepared according to the teaching of WO 2005/096844, to provide a sample B. A panel of professional tasters compared the two samples and all agreed that sample B was significantly less bitter and had more body and more mouthfell than sample A.

The invention claimed is:

1. A method of masking the bitter taste associated with the use in a consumable product of potassium chloride or another potassium salt, said method comprising the step of adding to said product a bitter masking composition comprising a sugar alcohol together with at least two of:

a compound of formula (I):

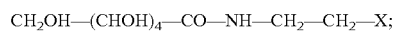

$CH_2OH-(CHOH)_4-CO-NH-CH_2-CH_2-X;$ a compound of formula (II):

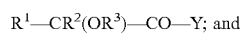

$R^1-CR^2(OR^3)-CO-Y;$ and a flavour modulating substance of formula (III):

$R_1-CR_2(OR_3)-CO-NR_4-Y'-X';$ wherein:
X represents —OH, —O(CO)R, —OPO$_3$H$_2$, —PO$_3$H$_2$, —OSO$_3$H or —SO$_3$H, and
R represents a C$_2$-C$_{10}$ group comprising at least one carboxylic acid group, or edible salts thereof;
Y represents either (i) a substituted or unsubstituted six membered heterocyclic ring, comprising at least two nitrogen atoms, wherein if substituted the heterocyclic ring is substituted with one or more substituents selected from the group of amino; hydroxyl; oxo; alkyl; and an esterified or unesterified monosaccharide unit, wherein if esterified said monosaccharide unit is esterified with one or more mono-, di- and/or triphosphate groups; or (ii) a bicyclic system comprising a five membered heterocyclic ring and a six membered heterocyclic ring, each ring comprising at least two nitrogen atoms, and each ring being unsubstituted or substituted with one or more substituents selected from the group of amino; hydroxyl; oxo; alkyl; and an esterified or unesterified monosaccharide unit, wherein if esterified said monosaccharide unit is esterified with one or more mono-, di- and/or triphosphate groups;
R$^1$ represents hydrogen; C$_1$-C$_8$ alkyl, C$_2$-C$_8$ alkenyl, C$_3$-C$_8$ cycloalkyl or C$_3$-C$_8$ cycloalkenyl, each unsubstituted or substituted with 1-8 substituents selected from hydroxyl, C$_1$-C$_3$ alkyl; C$_2$-C$_3$ alkenyl and C$_1$-C$_3$ carboxyl;
R$^2$ represents hydrogen; C$_1$-C$_8$ alkyl, C$_2$-C$_8$ alkenyl, C$_3$-C$_8$ cycloalkyl or C$_3$-C$_8$ cycloalkenyl, each unsubstituted or substituted with 1-8 substituents selected from hydroxyl, C$_1$-C$_3$ alkyl, C$_2$-C$_3$ alkenyl and C$_1$-C$_3$ carboxyl;
R$^3$ represents hydrogen; C$_1$-C$_3$ acyl or C$_1$-C$_3$ alkyl, each unsubstituted or substituted with 1-3 hydroxyl groups; and wherein
Y' represents a covalent bond, C$_1$-C$_5$ alkylene or C$_2$-C$_5$ alkenyl, each unsubstituted or substituted with 1-5 substituents selected from hydroxyl, C$_1$-C$_3$ alkoxyl and C$_1$-C$_3$ acyl;
X' represents phenyl, substituted with one or more substituents selected from hydroxyl, C$_1$-C$_3$ alkoxyl, and C$_1$-C$_3$ hydroxyalkyl;
R$_1$ represents hydrogen; C$_1$-C$_8$ alkyl, C$_2$-C$_8$ alkenyl, C$_3$-C$_8$ cycloalkyl or C$_3$-C$_8$ cycloalkenyl, each unsubstituted or substituted with 1-8 substituents selected from hydroxyl, oxo, $C_1$-$C_3$ alkyl, $C_2$-$C_3$ alkenyl, $C_1$-$C_3$ alkoxyl, $C_1$-$C_3$ acyl and $C_1$-$C_3$ carboxyl;

$R_2$ represents hydrogen; $C_1$-$C_8$ alkyl, $C_2$-$C_8$ alkenyl, $C_3$-$C_8$ cycloalkyl, or $C_3$-$C_8$ cycloalkenyl, each unsubstituted or substituted with 1-8 substituents selected from hydroxyl, $C_1$-$C_3$ alkyl, $C_2$-$C_3$ alkenyl and $C_1$-$C_3$ carboxyl;

$R_3$ represents hydrogen; or $C_1$-$C_3$ acyl or $C_1$-$C_3$ alkyl, each unsubstituted or substituted with 1-3 hydroxyl groups; and $R_4$ represents hydrogen; $C_1$-$C_6$ alkyl, $C_2$-$C_6$ alkenyl, $C_1$-$C_3$ acyl, $C_3$-$C_6$ cycloalkyl, $C_3$-$C_6$ cycloalkenyl or $C_1$ to $C_6$ acyl, each unsubstituted or substituted with 1-6 substituents selected from hydroxyl, $C_1$-$C_3$ alkyl and $C_2$-$C_3$ alkenyl, wherein the at least two of the compound of formula (I), the compound of formula (II) and the flavour modulating substance of formula (III) are present in said bitter masking composition in a concentration sufficient to mask the bitter taste associated with the use in a consumable product of potassium chloride or another potassium salt, wherein the bitter masking composition comprises the sugar alcohol together with at least two of:

the compound of formula (I) in amounts of 0.2% to 5% by weight;

the compound of formula (II) in amounts of 5% to 25% by weight;

and the flavour modulating substance of formula (III) in amounts of 1% to 15% by weight, based on the total weight of said bitter masking composition.

2. The method according to claim 1 wherein the weight ratio of sugar alcohol to potassium salt is 1:20 to 2:1.

3. The method according to claim 1 wherein the weight ratio of sugar alcohol to potassium salt is about 1:5 to 1:1.

4. The method according to claim 1 wherein a compound of formula (I) is N-gluconyl ethanolamine, or an edible salt thereof.

5. The method according to claim 1 wherein a compound of formula (II) is selected from N-lactoyl GMP, N-lactoyl AMP, N-lactoyl CMP, N-lactoyl IMP, N-gluconyl GMP, N-gluconyl AMP, N-gluconyl CMP and N-gluconyl IMP.

6. The method according to claim 5 wherein the compound of formula (II) is in pure form or forms a part of a Maillard flavour composition.

7. The method according to claim 1 wherein the flavour modulating substance (III) is N-lactoyl tyramine.

8. The method according to claim 1 wherein the sugar alcohol is selected from the group consisting of Ethylene glycol, Glycerol, Erythritol, Threitol, Ribitol, Arabitol, Xylitol, Lyxitol, Allitol, Altritol, Glucitol (=sorbitol), Mannitol, Gulitol, Iditol, Galactitol (=dulcitol), Talitol, Lactitol, Maltitol, Cellobiitol, Raffinitol, or compounds structurally related to sugar alcohols, Inositol, Tetrahydroxycyclobutane, Pentahydroxycyclopentane, Heptahydroxycycloheptane, partially hydrolyzed polysaccharides that have undergone a NaBH4 reduction step, and derivatives thereof.

9. The method according to claim 1 wherein the sugar alcohol is mannitol.

10. A method of potentiating the bitter masking effect of sugar alcohols in consumable products containing potassium chloride or another potassium salt, said method comprising the step of adding to said consumable product at least two of:

a compound of formula (I):

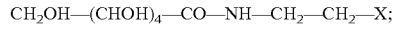

a compound of formula (II):

$R^1$—$CR^2(OR^3)$—CO—Y; and a flavour modulating substance of formula (III):

$R_1$—$CR_2(OR_3)$—CO—$NR_4$—Y'—X';

wherein:

X represents —OH, —O(CO)R, —OPO$_3$H$_2$, —PO$_3$H$_2$, —OSO$_3$H or —SO$_3$H, and R represents a $C_2$-$C_{10}$ group comprising at least one carboxylic acid group, or edible salts thereof;

Y represents either (i) a substituted or unsubstituted six membered heterocyclic ring, comprising at least two nitrogen atoms, wherein if substituted the heterocyclic ring is substituted with one or more substituents selected from the group of amino; hydroxyl; oxo; alkyl; and an esterified or unesterified monosaccharide unit, wherein if esterified said monosaccharide unit is esterified with one or more mono-, di- and/or triphosphate groups; or (ii) a bicyclic system comprising a five membered heterocyclic ring and a six membered heterocyclic ring, each ring comprising at least two nitrogen atoms, and each ring being unsubstituted or substituted with one or more substituents selected from the group of amino; hydroxyl; oxo; alkyl; and an esterified or unesterified monosaccharide unit, wherein if esterified said monosaccharide unit is esterified with one or more mono-, di- and/or triphosphate groups;

$R^1$ represents hydrogen; $C_1$-$C_8$ alkyl, $C_2$-$C_8$ alkenyl, $C_3$-$C_8$ cycloalkyl or $C_3$-$C_8$ cycloalkenyl, each unsubstituted or substituted with 1-8 substituents selected from hydroxyl, $C_1$-$C_3$ alkyl; $C_2$-$C_3$ alkenyl and $C_1$-$C_3$ carboxyl;

$R^2$ represents hydrogen; $C_1$-$C_8$ alkyl, $C_2$-$C_8$ alkenyl, $C_3$-$C_8$ cycloalkyl or $C_3$-$C_8$ cycloalkenyl, each unsubstituted or substituted with 1-8 substituents selected from hydroxyl, $C_1$-$C_3$ alkyl, $C_2$-$C_3$ alkenyl and $C_1$-$C_3$ carboxyl;

$R^3$ represents hydrogen; $C_1$-$C_3$ acyl or $C_1$-$C_3$ alkyl, each unsubstituted or substituted with 1-3 hydroxyl groups; and wherein Y' represents a covalent bond, $C_1$-$C_5$ alkylene or $C_2$-$C_5$ alkenyl, each unsubstituted or substituted with 1-5 substituents selected from hydroxyl, $C_1$-$C_3$ alkoxyl and $C_1$-$C_3$ acyl;

X' represents phenyl, substituted with one or more substituents selected from hydroxyl, $C_1$-$C_3$ alkoxyl, and $C_1$-$C_3$ hydroxyalkyl;

$R_1$ represents hydrogen; $C_1$-$C_8$ alkyl, $C_2$-$C_8$ alkenyl, $C_3$-$C_8$ cycloalkyl or $C_3$-$C_8$ cycloalkenyl, each unsubstituted or substituted with 1-8 substituents selected from hydroxyl, oxo, $C_1$-$C_3$ alkyl, $C_2$-$C_3$ alkenyl, $C_1$-$C_3$ alkoxyl, $C_1$-$C_3$ acyl and $C_1$-$C_3$ carboxyl;

$R_2$ represents hydrogen; $C_1$-$C_8$ alkyl, $C_2$-$C_8$ alkenyl, $C_3$-$C_8$ cycloalkyl, or $C_3$-$C_8$ cycloalkenyl, each unsubstituted or substituted with 1-8 substituents selected from hydroxyl, $C_1$-$C_3$ alkyl, $C_2$-$C_3$ alkenyl and $C_1$-$C_3$ carboxyl;

$R_3$ represents hydrogen; or $C_1$-$C_3$ acyl or $C_1$-$C_3$ alkyl, each unsubstituted or substituted with 1-3 hydroxyl groups; and $R_4$ represents hydrogen; $C_1$-$C_6$ alkyl, $C_2$-$C_6$ alkenyl, $C_1$-$C_3$ acyl, $C_3$-$C_6$ cycloalkyl, $C_3$-$C_6$ cycloalkenyl or $C_1$ to $C_6$ acyl, each unsubstituted or substituted with 1-6 substituents selected from hydroxyl, $C_1$-$C_3$ alkyl and $C_2$-$C_3$ alkenyl, wherein the at least two of the compound of formula (I), the compound of formula (II) and the flavour modulating substance of formula (III) are added to said consumable product in a concentration sufficient to potentiate the bitter masking effect of sugar alcohols in consumable products containing potassium chloride or another potassium salt,
wherein the step of adding comprises adding to said consumable product at least two of
the compound of formula (I) in amounts of 5 to 250 ppm;
the compound of formula (II) in amounts of 10 to 2500 ppm;
and the flavour modulating substance of formula (III) in amounts of 10 to 100 ppm.

11. A bitter masking composition comprising a sugar alcohol and at least two of:
a compound of formula (I):

$$CH_2OH-(CHOH)_4-CO-NH-CH_2-CH_2-X;$$

a compound of formula (II):

$$R^1-CR^2(OR^3)-CO-Y; \text{ and}$$

a flavour modulating substance of formula (III):

$$R_1-CR_2(OR_3)-CO-NR_4-Y'-X';$$

wherein:
X represents —OH, —O(CO)R, —OPO$_3$H$_2$, —PO$_3$H$_2$, —OSO$_3$H or —SO$_3$H, and
R represents a $C_2$-$C_{10}$ group comprising at least one carboxylic acid group, or edible salts thereof;
Y represents either (i) a substituted or unsubstituted six membered heterocyclic ring, comprising at least two nitrogen atoms, wherein if substituted the heterocyclic ring is substituted with one or more substituents selected from the group of amino; hydroxyl; oxo; alkyl; and an esterified or unesterified monosaccharide unit, wherein if esterified said monosaccharide unit is esterified with one or more mono-, di- and/or triphosphate groups; or (ii) a bicyclic system comprising a five membered heterocyclic ring and a six membered heterocyclic ring, each ring comprising at least two nitrogen atoms, and each ring being unsubstituted or substituted with one or more substituents selected from the group of amino; hydroxyl; oxo; alkyl; and an esterified or unesterified monosaccharide unit, wherein if esterified said monosaccharide unit is esterified with one or more mono-, di- and/or triphosphate groups;
$R^1$ represents hydrogen; $C_1$-$C_8$ alkyl, $C_2$-$C_8$ alkenyl, $C_3$-$C_8$ cycloalkyl or $C_3$-$C_8$ cycloalkenyl, each unsubstituted or substituted with 1-8 substituents selected from hydroxyl, $C_1$-$C_3$ alkyl; $C_2$-$C_3$ alkenyl and $C_1$-$C_3$ carboxyl;
$R^2$ represents hydrogen; $C_1$-$C_8$ alkyl, $C_2$-$C_8$ alkenyl, $C_3$-$C_8$ cycloalkyl or $C_3$-$C_8$ cycloalkenyl, each unsubstituted or substituted with 1-8 substituents selected from hydroxyl, $C_1$-$C_3$ alkyl, $C_2$-$C_3$ alkenyl and $C_1$-$C_3$ carboxyl;
$R^3$ represents hydrogen; $C_1$-$C_3$ acyl or $C_1$-$C_3$ alkyl, each unsubstituted or substituted with 1-3 hydroxyl groups; and wherein
Y' represents a covalent bond, $C_1$-$C_5$ alkylene or $C_2$-$C_5$ alkenyl, each unsubstituted or substituted with 1-5 substituents selected from hydroxyl, $C_1$-$C_3$ alkoxyl and $C_1$-$C_3$ acyl;
X' represents phenyl, substituted with one or more substituents selected from hydroxyl, $C_1$-$C_3$ alkoxyl, and $C_1$-$C_3$ hydroxyalkyl;
$R_1$ represents hydrogen; $C_1$-$C_8$ alkyl, $C_2$-$C_8$ alkenyl, $C_3$-$C_8$ cycloalkyl or $C_3$-$C_8$ cycloalkenyl, each unsubstituted or substituted with 1-8 substituents selected from hydroxyl, oxo, $C_1$-$C_3$ alkyl, $C_2$-$C_3$ alkenyl, $C_1$-$C_3$ alkoxyl, $C_1$-$C_3$ acyl and $C_1$-$C_3$ carboxyl;
$R_2$ represents hydrogen; $C_1$-$C_8$ alkyl, $C_2$-$C_8$ alkenyl, $C_3$-$C_8$ cycloalkyl, or $C_3$-$C_8$ cycloalkenyl, each unsubstituted or substituted with 1-8 substituents selected from hydroxyl, $C_1$-$C_3$ alkyl, $C_2$-$C_3$ alkenyl and $C_1$-$C_3$ carboxyl;
$R_3$ represents hydrogen; or $C_1$-$C_3$ acyl or $C_1$-$C_3$ alkyl, each unsubstituted or substituted with 1-3 hydroxyl groups; and
$R_4$ represents hydrogen; $C_1$-$C_6$ alkyl, $C_2$-$C_6$ alkenyl, $C_1$-$C_3$ acyl, $C_3$-$C_6$ cycloalkyl, $C_3$-$C_6$ cycloalkenyl or $C_1$ to $C_6$ acyl, each unsubstituted or substituted with 1-6 substituents selected from hydroxyl, $C_1$-$C_3$ alkyl and $C_2$-$C_3$ alkenyl,
wherein the at least two of the compound of formula (I), the compound of formula (II) and the flavour modulating substance of formula (III) are present in said bitter masking composition in a concentration sufficient to mask bitter taste,
the compound of formula (I) is present in amounts of 0.2% to wherein said at least two of 5% by weight;
the compound of formula (II) is present in amounts of 5% to 25% by weight;
and the flavour modulating substance of formula (III) is present in amounts of 1% to 15% by weight, based on the total weight of said bitter masking composition.

12. The bitter masking composition according to claim 11 comprising a sugar alcohol and a compound of formula (I) and a compound of formula (II).

13. The bitter masking composition according to claim 12 wherein the sugar alcohol is mannitol.

14. The bitter masking composition according to claim 11 wherein a compound of formula (I) is N-gluconyl ethanolamine, or an edible salt thereof; a compound of the formula (II) is selected from the group consisting of N-lactoyl GMP, N-lactoyl AMP, N-lactoyl CMP, N-lactoyl IMP, N-gluconyl GMP, N-gluconyl AMP, N-gluconyl CMP and N-gluconyl IMP; and a flavour modulating substance (III) is N-lactoyl tyramine.

15. The bitter masking composition according to claim 11 wherein a compound of formula (I) is N-gluconyl ethanolamine, or an edible salt thereof; a compound of the formula (II) is selected from the group consisting of N-lactoyl GMP, N-lactoyl AMP, N-lactoyl CMP, N-lactoyl IMP, N-gluconyl GMP, N-gluconyl AMP, N-gluconyl CMP and N-gluconyl IMP.

16. The bitter masking composition according to claim 11 wherein the compound of formula (II) is employed as part of a Maillard flavour composition.

17. A consumer product containing potassium chloride or another potassium salt comprising the bitter masking composition as defined in claim 11.

18. The bitter masking composition according to claim 11 comprising a sugar alcohol, a compound of formula (I) and a flavour modulating substance of formula (III).

19. The bitter masking composition according to claim 11 comprising a sugar alcohol, a compound of formula (I), a compound of formula (II), and a flavour modulating substance of formula (III).

20. The method according to claim 1 wherein the step of adding comprises adding to said product the bitter masking composition comprising the sugar alcohol together with at least two of:

the compound of formula (I) in amounts of 5 to 250 ppm;
the compound of formula (II) in amounts of 10 to 2500 ppm;
and the flavour modulating substance of formula (III) in amounts of 10 to 100 ppm, said amounts based on the weight of said product.

* * * * *